(12) United States Patent
Vogt (10) Patent No.: US 8,514,659 B2
(45) Date of Patent: Aug. 20, 2013

(54) MULTI-STATE BEAMFORMING ARRAY

(75) Inventor: Mark A. Vogt, San Diego, CA (US)

(73) Assignee: Teledyne RD Instruments, Inc., Poway, CA (US)

( * ) Notice: Subject to any disclaimer, the term of this patent is extended or adjusted under 35 U.S.C. 154(b) by 0 days.

(21) Appl. No.: 13/595,756

(22) Filed: Aug. 27, 2012

(65) Prior Publication Data

US 2013/0058194 A1    Mar. 7, 2013

Related U.S. Application Data

(63) Continuation of application No. 12/330,433, filed on Dec. 8, 2008, now Pat. No. 8,254,208.

(51) Int. Cl.
*G01S 15/00* (2006.01)

(52) U.S. Cl.
USPC ............................................................ 367/88

(58) Field of Classification Search
USPC .................................. 367/88, 105, 122, 903
See application file for complete search history.

(56) References Cited

U.S. PATENT DOCUMENTS

| | | |
|---|---|---|
| 3,648,225 A | 3/1972 | Kritz et al. |
| 3,803,606 A | 4/1974 | Lebail et al. |
| 4,050,055 A | 9/1977 | DiLeo |
| 4,062,237 A | 12/1977 | Fox |
| 4,078,234 A | 3/1978 | Fishbein et al. |
| 4,138,657 A | 2/1979 | Shave |
| 4,219,887 A | 8/1980 | MacCready, Jr. |
| 4,244,026 A | 1/1981 | Dickey, Jr. |
| 4,270,191 A | 5/1981 | Peynaud |
| 4,320,765 A | 3/1982 | Cathignol et al. |
| 4,603,408 A | 7/1986 | Singhal et al. |
| 4,640,292 A | 2/1987 | Tykulsky et al. |
| 4,751,847 A | 6/1988 | Katakura et al. |
| 4,794,574 A | 12/1988 | Grall |
| 4,799,490 A | 1/1989 | Namekawa |
| 4,831,874 A | 5/1989 | Daubin et al. |
| 4,847,817 A | 7/1989 | Au et al. |
| 4,872,146 A | 10/1989 | Farmer et al. |
| 4,960,329 A | 10/1990 | Schofield |

(Continued)

FOREIGN PATENT DOCUMENTS

| | | |
|---|---|---|
| FR | 2686457 | 7/1993 |
| GB | 2128833 | 5/1984 |

(Continued)

OTHER PUBLICATIONS

Allender, et al., "The WADIC Project: A Comprehensive Field Evaluation of Directional Wave Instrumentation," Ocean Engineering, vol. 16, No. 56, pp. 505-536, 1989.

(Continued)

*Primary Examiner* — Daniel Pihulic (74) *Attorney, Agent, or Firm* — Knobbe, Martens, Olson & Bear, LLP (57) ABSTRACT

A sonar system and method of operating a sonar system are disclosed. In one embodiment, the sonar system comprises an array of transducers and a multiplexer configurable into a plurality of states. In one embodiment, the multiplexer, when in a first state, electrically couples a plurality of connections with the plurality of transducers via a first mapping and, in a second state, electrically couples the plurality of connections with the plurality of transducers via a second mapping.

24 Claims, 7 Drawing Sheets

(56) References Cited

U.S. PATENT DOCUMENTS

| | | | |
|---|---|---|---|
| 5,184,330 | A | 2/1993 | Adams et al. |
| 5,208,785 | A | 5/1993 | Brumley et al. |
| 5,208,788 | A | 5/1993 | Dancer et al. |
| 5,483,499 | A | 1/1996 | Brumley et al. |
| 5,521,883 | A | 5/1996 | Fage et al. |
| 5,615,173 | A | 3/1997 | Brumley et al. |
| RE35,535 | E | 6/1997 | Brumley et al. |
| 5,689,445 | A | 11/1997 | Vogt et al. |
| 5,808,967 | A | 9/1998 | Yu et al. |
| 6,052,334 | A | 4/2000 | Brumley et al. |
| 6,213,947 | B1 | 4/2001 | Phillips |
| 6,262,942 | B1 | 7/2001 | Stanton |
| 6,282,151 | B1 | 8/2001 | Brumley et al. |
| 6,314,053 | B1 | 11/2001 | Doisy et al. |
| 6,453,256 | B1 | 9/2002 | Gordon et al. |
| 6,539,323 | B2 | 3/2003 | Olson |
| 6,647,804 | B1 | 11/2003 | Deines |
| 6,700,834 | B2 | 3/2004 | Brumley et al. |
| 6,701,252 | B2 | 3/2004 | Brown |
| 6,820,008 | B1 | 11/2004 | van Smirren et al. |
| 6,937,938 | B2 | 8/2005 | Sansone |
| 6,947,880 | B2 | 9/2005 | Johnson et al. |
| 6,983,208 | B2 | 1/2006 | Metcalf et al. |
| 7,007,555 | B2 | 3/2006 | Strong et al. |
| 7,173,880 | B2 | 2/2007 | Bernard |
| 7,267,013 | B2 | 9/2007 | Maier |
| 7,277,359 | B2 | 10/2007 | Bernard |
| 7,317,660 | B2 | 1/2008 | Brumley et al. |
| 7,343,793 | B2 | 3/2008 | Tillotson et al. |
| 7,352,651 | B2 | 4/2008 | Lohrmann et al. |
| 7,379,387 | B2 | 5/2008 | Strong et al. |
| 7,420,875 | B1 | 9/2008 | Hendricks |
| 7,545,705 | B2 | 6/2009 | Brumley et al. |
| 7,847,925 | B2 | 12/2010 | Vogt |
| 8,254,208 | B2 * | 8/2012 | Vogt ................................ 367/88 |
| 2002/0018400 | A1 | 2/2002 | Brumley et al. |
| 2002/0124629 | A1 | 9/2002 | Hurson |
| 2003/0214880 | A1 | 11/2003 | Rowe |
| 2004/0184350 | A1 | 9/2004 | Brumley et al. |
| 2005/0199056 | A1 | 9/2005 | Strong et al. |
| 2006/0155492 | A1 | 7/2006 | Strong et al. |
| 2008/0080313 | A1 | 4/2008 | Brumley et al. |
| 2008/0080314 | A1 | 4/2008 | Brumley et al. |
| 2008/0080315 | A1 | 4/2008 | Vogt |
| 2010/0142324 | A1 | 6/2010 | Vogt |
| 2013/0058194 | A1 * | 3/2013 | Vogt ................................ 367/90 |

FOREIGN PATENT DOCUMENTS

| | | |
|---|---|---|
| JP | HEI 4-138273 | 12/1992 |
| JP | HEI 7218254 | 8/1995 |
| JP | 10197549 | 7/1998 |
| JP | 2948472 | 7/1999 |

OTHER PUBLICATIONS

Dewey et al.: "Higher Moment Flow Parameters from Various ADCP Transducer Configurations", 2005, University of Victoria, 21 pages.

Gargett, Ann: "Observing Turbulence with a Modified Acoustic Doppler Current Profiler", Journal of Atmospheric and Oceanic Technology, vol. 11, Dec. 1994, pp. 1592-1610.

Glad, I.K., et al. (1992) the maximum-likelihood property of estimators of wave parameters from heave, pitch, and roll buoys. American Meteorological Society V.9: 169-173.

Hashimoto, N., et al. (1996) Improvement of submerged Doppler-type directional wave meter and its application to field observations. Coastal Engineering 629-642.

Haug, "Estimations of Directional Spectra by ML/ME Methods," Proc. Ocean Wave Measurement and Analysis, pp. 394-405, Jul. 1993.

Herbers, T.H., et al. (1991) Field Verification of Acoustic Doppler Surface Gravity Wave Measurements. Journal of Geophysical Research V.96, No. C9:17,023-17,035.

International Search Report and Written Opinion issued on Mar. 11, 2009 for International application No. PCT/US2008/066778.

Kirlin, R. Lynn, Estimation of Transfer Function Parameters with Output Fourier Transform Sensitivity Vectors. 1977 IEEE International Conference on Acoustics, Speech and Signal Processing (Cat. No. 97CB36052) Munich, Germany, Apr. 21-24, 1997, pp. 3933-3936 vol. 5.

Krogstad, "Maximum Likelihood Estimation of Ocean Wave Spectra from General Arrays of Wave Gauges, "Modeling, Identification, and Control, vol. 9, No. 2, pp. 81-97, 1988.

Krogstad, H.E., et al. (1988) High-resolution directional wave spectra from horizontally mounted acoustic Doppler current meters. Journal of Atmospheric and Oceanic Technology V.5, No. 4: 340-352.

MGD Technologies, Inc.: "Acoustic Doppler Flow Meter Technical Manual", P/N 955-6002-00, Jan. 2000.

Pinkel, R. et al. (1987) Open ocean surface wave measurement using Doppler sonar. Journal of Geophysical Research V.92, No. C12:12,967-12.973.

Rasmussen, Egil: "5 Beam 600k Hz Workhorse—Application Note", Teledyne RD Instruments, Feb. 14, 2007, 8 pages.

Smith, J. A. (1989) Doppler sonar and surface waves: range and resolution. Journal of Atmospheric and Oceanic Technology V6:680-696.

Smith, J.A., et al. (1995) Directional surface wave estimates from Doppler sonar data. Journal of Atmospheric and Oceanic Technology V.12:617-632.

Stockhausen, W.T. (1994) Directional wave spectra using an acoustic doppler current profiler. A Thesis. Library of the Virginia Institute of Marine Science.

Takayama, T., et al. (1994) Development of a submerged Doppler-type directional wave meter. Coastal Engineering C.46:624-634.

Terray et al. "Measuring Waves and Currents with an Upward-Looking ADCP", Proceedings of the IEEE Sixth Working Conference on Current Measurement, Mar. 1999, pp. 66-71.

Terray, E., et al. (1997) Measuring wave height and direction using upward-looking ADCP's. IEEE Oceans '97 1-4.

Terray, E.A., et al. (1990) Measuring wave direction using upward-looking Doppler sonar. Proceedings of the IEEE Fourth Working Conference on Current Measurement 1-6 and Fig. 1-Fig. 4.

Visbeck, M., et al. (1995) Sea surface conditions remotely sensed by upward-looking ADCP's. Journal of Atmospheric and Oceanic Technology V12:141-149.

Zedel, L. (1994) Deep ocean wave measurements using a vertically oriented sonar. Journal of Atmospheric and Oceanic Technology V.11:182-191.

Office Action of Feb. 18, 2009 in U.S. Appl. No. 11/764,397, filed Jun. 18, 2007.

Office Action of Sep. 9, 2009 in U.S. Appl. No. 11/764,397, filed Jun. 18, 2007.

Office Action of Dec. 17, 2009 in U.S. Appl. No. 11/764,397, filed Jun. 18, 2007.

Advisory Action of Mar. 24, 2010 in U.S. Appl. No. 11/764,397, filed Jun. 18, 2007.

Office Action of May 26, 2010 in U.S. Appl. No. 11/764,397, filed Jun. 18, 2007.

* cited by examiner

|⊢d⊣
┬ A B C D A B C D A B C D
d
⊥ E F G H E F G H E F G H
I J K L I J K L I J K L
M N O P M N O P M N O P
A B C D A B C D A B C D
E F G H E F G H E F G H
I J K L I J K L I J K L
M N O P M N O P M N O P
A B C D A B C D A B C D
E F G H E F G H E F G H
I J K L I J K L I J K L
M N O P M N O P M N O P
A B C D A B C D A B C D
E F G H E F G H E F G H
I J K L I J K L I J K L
M N O P M N O P M N O P

FIG. 4A

|—$d_2$—|
```
  A A B B C C D D A A B B C C D D
↕ A A B B C C D D A A B B C C D D
$d_2$ E E F F G G H H E E F F G G H H
  E E F F G G H H E E F F G G H H
  I I J J K K L L I I J J K K L L
  I I J J K K L L I I J J K K L L
  M M N N O O P P M M N N O O P P
  M M N N O O P P M M N N O O P P
  A A B B C C D D A A B B C C D D
  A A B B C C D D A A B B C C D D
  E E F F G G H H E E F F G G H H
  E E F F G G H H E E F F G G H H
  I I J J K K L L I I J J K K L L
  I I J J K K L L I I J J K K L L
  M M N N O O P P M M N N O O P P
  M M N N O O P P M M N N O O P P
```

MULTI-STATE BEAMFORMING ARRAY

CROSS-REFERENCE TO RELATED APPLICATION

This application is a continuation of U.S. patent application Ser. No. 12/330,433 filed Dec. 8, 2008, titled MULTI-STATE BEAMFORMING ARRAY, the disclosure of which is hereby incorporated by reference in its entirety herein.

BACKGROUND

1. Field

This application generally relates to acoustic range estimation, and in particular to sonar range estimation using multi-beam devices.

2. Description of the Related Technology

A current profiler is a type of sonar system that is used to remotely measure water velocity over varying ranges. Current profiles are used in freshwater environments such as rivers, lakes, and estuaries, as well as in saltwater environments such as the ocean, for studying the effects of current velocities. The measurement of accurate current velocities is important in such diverse fields as weather prediction, biological studies of nutrients, environmental studies of sewage dispersion, and commercial exploration for natural resources, including oil.

Typically, current profilers are used to measure current velocities in a vertical column of water for each depth "cell" of water up to a maximum range, thus producing a "profile" of water velocities. The general profiler system includes a transducer to generate pulses of sound (which when down-converted to human hearing frequencies sound like "pings") that backscatter as echoes from plankton, small particles, and small-scale inhomogeneities in the water. The received sound has a Doppler frequency shift proportionate to the relative velocity between the scatters and the transducer.

The physics for determining a single velocity vector component ($v_x$) from such a Doppler frequency shift may be concisely stated by the following equation:

$$v_x = \frac{cf_D}{2f_T \cos\theta} \quad (1)$$

In equation (1), c is the velocity of sound in water, about 1500 meters/second. Thus, by knowing the transmitted sound frequency, $f_T$, and declination angle of the transmitter transducer, $\theta$, and measuring the received frequency from a single, narrowband pulse, the Doppler frequency shift, $f_D$, determines one velocity vector component. Relative velocity of the measured horizontal "slice", or depth cell, may be further determined by subtracting out a measurement of vessel earth reference velocity, $v_e$. Earth reference velocity can be measured by pinging the ocean bottom whenever it comes within sonar range or by a navigation system such as LORAN or GPS.

Commercial current profilers are typically configured as an assembly of four diverging transducers, spaced at 90° azimuth intervals from one another around the electronics housing. This transducer arrangement is known in the technology as the Janus configuration. A three-beam system permits measurements of three velocity components, $v_x$, $v_y$ and $v_z$ (sometimes identified respectively as u, v, w in oceanographic literature) under the assumption that currents are uniform in the plane perpendicular to the transducers mutual axis. However, four beams are often used for redundancy and reliability. The current profiler system may be attached to the hull of a vessel, remain on stationary buoys, or be moored to the ocean floor.

Of particular importance to the vessel-mounted current profiler is the accurate determination of vessel velocity. The earth reference water velocities can then be calculated by subtracting out the vessel velocity. As is well-known, the movement of the vessel with respect to the earth is based on establishing at least two fixed reference points over a period of time. In a current profiler, one common technique to find the bottom is to interleave a bottom range pulse with the current velocity pulses. The bottom range pulse is generally of a longer duration than other pulses so as to fully ensonify the bottom. The length of the pulse may be chosen according to the assumed maximum depth and the angle subtended by the transducer.

In some existing current profilers the decision-making for bottom detection has been based on a simple comparison between received signal amplitude and a threshold value. While performing reasonably well, these systems may produce "false bottoms" as a result of strong inhomogeneities or life layers, such as plankton or schooling fish, which offer alternative sources of acoustic reflection. Thus, it will be readily appreciated that false bottoms, located at ranges from the transducer that are less than the range to the actual bottom, can lead to inaccurate range and velocity measurements.

Accordingly, more accurate sonar systems to detect the bottom of a body of water are desired. In particular, a sonar system that minimizes the detection of false bottoms will improve the quality of vessel and water velocities. It would be a further improvement if the sonar system could compensate for signal losses due to water absorption and spreading.

SUMMARY OF THE CERTAIN INVENTIVE ASPECTS

One aspect of the invention is a sonar system comprising a plurality of transducers, and a multiplexer configurable into a plurality of states, wherein, in a first state, the multiplexer electrically couples a plurality of connections with the plurality of transducers via a first mapping, wherein, in a second state, the multiplexer electrically couples the plurality of connections with the plurality of transducers via a second mapping, and wherein, the first and second subset mapping are different.

Another aspect of the invention is a method of using a sonar system, the method comprising setting a multiplexer into a first state in which the multiplexer electrically couples a set of connections with a plurality of transducers via a first mapping, setting the multiplexer into a second state in which the multiplexer electrically couples the plurality of connections with the plurality of transducers via a second mapping, wherein the first and second mapping are different, and transmitting data to or receiving data from the plurality of transducers via the multiplexer.

DETAILED DESCRIPTION OF CERTAIN INVENTIVE EMBODIMENTS

Reference is now made to the drawings wherein like numerals refer to like parts throughout.

Beamforming, or directional transmission, is a way of altering the radiation pattern or "beam pattern" of a signal source, such as a transducer array. Beamforming also refers to directional reception, and is a way of processing signals received on a transducer array to alter the receiving pattern or "beam pattern" of the array. One particular beamforming device generates a set of four acoustic beams denoted a set of Janus beams, in which two of the beams are oriented along a first axis and the other two beams are oriented along a second, perpendicular axis. In one embodiment disclosed herein, a multiplexer is used which enables a single transducer array to generate two sets of Janus beams. Beamforming devices, and in particular, devices having a Janus beam configuration, find utility in a number of applications, including bathymetry, echo sounding, and current profiling.

Figure 1:
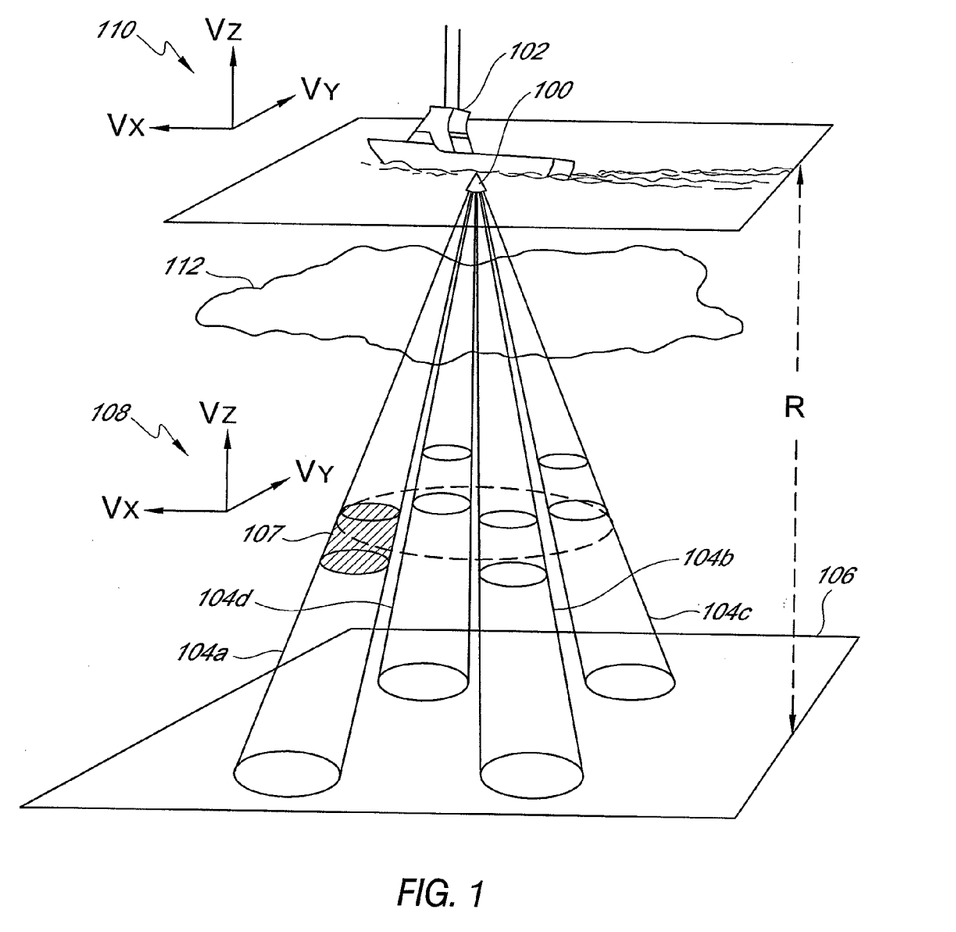
FIG. 1 is perspective view of a download-looking current profiler having a Janus configuration of transducers, wherein the current profiler is attached to the hull of vessel.

FIG. 1 illustrates a current profiler 100 which is attached to the hull of a moving vessel 102. The current profiler 100, as shown in FIG. 1, generates a set of acoustic beams 104a, 104b, 104c, 104d which emanate from one or more transducers. An exemplary current profiler is disclosed in U.S. Pat. No. 5,208,785, which is hereby incorporated by reference. In the illustrated embodiment, the current profiler 100 is downward-looking, that is, the acoustic beams 104 are directed in a generally vertical orientation towards an acoustically reflective surface such as the ocean bottom 106 and the beams 104 are in a Janus configuration. Each beam 104 "illuminates" a water column which can be decomposed into horizontal slices known as range, or depth, cells such as the cell indicated at 107. By suitable transmission of acoustic beams and reception of resulting echoes received from the cells, the echo data can be transformed into a Doppler frequency, a velocity along the beam 104, and then one or more orthogonal current velocity components such as those indicated at 108.

Since the vessel 102 is moving in the illustrated embodiment, the measured velocity of the range cell 107 is relative to the velocity of the vessel 102. Therefore, a bottom range pulse is periodically interleaved in the beams 104 to determine the orthogonal velocity components of the vessel such as those indicated at 110. The earth reference velocity of the range cell 107 is then obtained by subtracting the velocity of the vessel 102 from the measured vessel reference velocity of the range cell 107.

Although bottom tracking using a downward looking current profiler 100 is described herein, it is to be recognized that other uses may be made of the methods and systems described herein. For instance, embodiments may include, for example, an upward looking configuration to measure the movement of sheets of ice in one of the polar regions.

Directional transmission can be accomplished through a phased array. A phased array is a group of transducers in which the relative phases of the respective signals feeding the transducers are varied in such a way that the effective radiation pattern of the array is reinforced in a specific direction and suppressed in other directions. The relative amplitudes of, and constructive and destructive interference effects among, the signals radiated by the individual transducers determine the effective radiation pattern of the array.

In particular, a regular linear phased array is a phased array in which the elements are arranged in a line with equal spacing between each of the elements. A beam-like radiation pattern, such as those shown in FIG. 1, is achieved by the array when each of the elements is fed a signal phase-shifted by an amount proportional to a distance along the array.

Figure 2A:
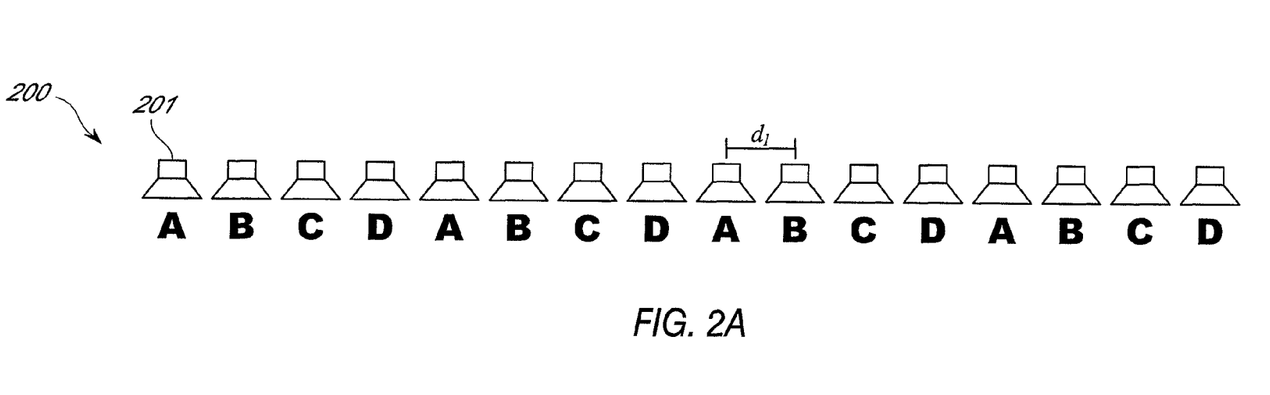
FIG. 2A is a diagram illustrating a one-dimensional regular linear phased array in a first state.

FIG. 2A is a diagram illustrating a one-dimensional regular linear phased array in a first state. Beam generation using such a phased array can be approximated by the following functional relationship $$\frac{d}{\lambda} = \frac{\Delta\phi}{2\pi \sin\theta}, \quad (2)$$

where d is the element spacing, $\lambda$ is the wavelength of the signal fed to the elements, $\Delta\phi$ is the phase between the elements, and $\theta$ is the resultant beam angle. The array 200 comprises sixteen transducers 201 separated by a transducer spacing $d_1$. Each transducer 201 is configured to transmit a phase-shifted version of the same signal, wherein the signal has a wavelength $\lambda$. In the first state of the array, the relative phase between each adjacent transducer, denoted $\Delta\phi$, is either +90 degrees or −90 degrees, resulting in a beam angle of +$\theta$ or −$\theta$ respectively. In the first state, the array of transducers forms an array having an element spacing of $d_1$. The signal transmitted from a first element of the array and the signal from another element of the array which is spaced four elements away are phase-shifted by 360 degrees, and are thus identical signals. The result is that, in order to form a beam with a beam angle of +$\theta$, only four different signals, denoted A, B, C, and D in FIG. 2A, are transmitted from elements of the array, corresponding to a signal phase-shifted by 0 degrees, 90 degrees, 180 degrees, and 270 degrees respectively. To form a beam with a beam angle of −$\theta$, the four different signals, denoted A, B, C, and D in FIG. 2A, correspond to a signal phase-shifted by 0 degrees, −90 degrees, −180 degrees, and −270 degrees respectively.

Figure 2B:
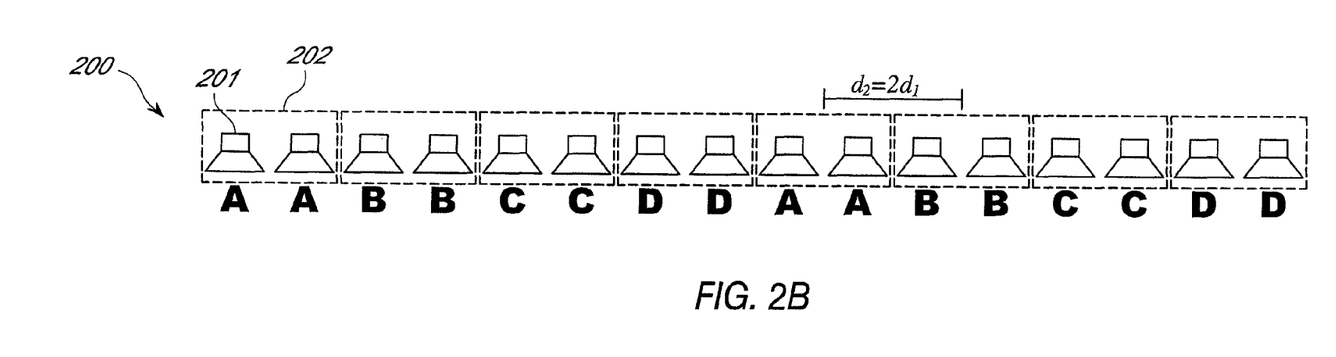
FIG. 2B is a diagram illustrating the one-dimensional regular linear phased array in a second state.

FIG. 2B is a diagram illustrating the one-dimensional regular linear phased array in a second state. In the second state of the array 200, the transducers 201 are functionally combined to form groups of adjacent transducers 202. Each group of adjacent transducers 202 is configured to transmit the same signal, thus each group 202 acts a single element. The resulting array of groups is a regular linear array with an element spacing of $d_2$, which is two times $d_1$.

Through appropriate multiplexing which maps particular signals to particular transducers, a single array of transducers can be used to realize at least two arrays, where the second array has an element spacing of twice the first array. In the illustrated embodiment, the group size was two, i.e., each group consists of two elements. If the group size were, e.g., three, an array would be realized having an element spacing of three times that of the first array. Other spacings and groupings are possible.

Figure 3A:
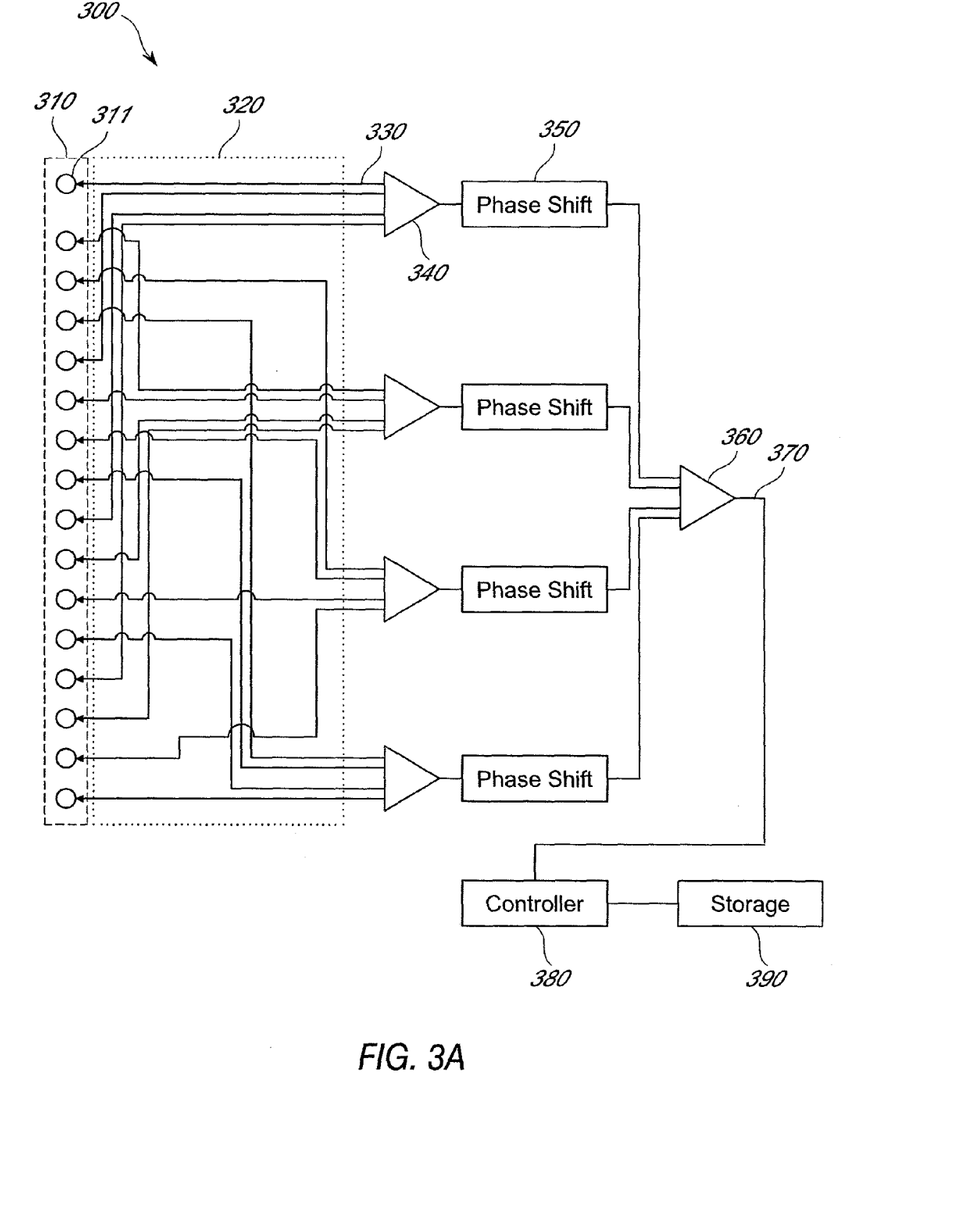
FIG. 3A is a functional block diagram of beamforming system comprising a multiplexer in a first state.

FIG. 3A is a functional block diagram of beamforming system 300 comprising a multiplexer 320 in a first state. FIG. 3A illustrates the electric paths between a set of connections 330 of the multiplexer 320 and the transducers 311 when the multiplexer 320 is set in a first state. In this state, each connection 330 is coupled to a transducer 311 via a first mapping.

The multiplexer 320 may be configured to couple each of the transducers via a mapping to a unique connection. In other embodiments, or other states, the mapping of the multiplexer may be configured to couple multiple transducers to a single connection, or to couple multiple connections to a single transducers. In some embodiments, a single connection may be coupled to a subset of the transducers. A subset may include only one element of the set, at least two elements of the set, at least three elements of the set, a significant portion (e.g. at least 10%, 20%, 30%) of the elements of the set, a majority of the elements of the set, nearly all (e.g., at least 80%, 90%, 95%) of the elements of the set, all but at least two, all but one, or all of the elements of the set. Thus, a state of the multiplexer may be defined by, among other things, a mapping of connections on one side of the multiplexer to transducers on another side of the multiplexer.

When the array is receiving or in a receiving mode, input signals are received from the transducers 311 and fed into the multiplexer 320. The multiplexer 320 electrically couples each of the transducers to a connection 330, which in receiving mode, acts as an output, which is connected to at least one of the splitter/summers 340, which in this mode acts as a summer which sums the input signals to produce a summed signal. The summed signals output from the splitter/summers 340 are phase-shifted at a number of phase-shifters 350, before being fed to another splitter/summer 360, which again acts as a summer in a receiving mode. In one embodiment, there are four phase-shifters, which shift the signal by 0 degrees, 90 degrees, 180 degrees, and 270 degrees. The splitter/summer 360 sums the phase-shifted signals to produce a beamformed signal at the terminal connection 370. Depending on the state of the phase-shifters 350, different beamformed signals can be produced at the terminal connection 370. In some embodiments, multiple signals, corresponding to different beams, are simultaneously produced at the terminal connection 370. The terminal connection is further connected to a controller 380 which reads the beamformed signal and can store the beamformed signal in a storage 390. The controller 380 may also be configured to set the multiplexer into at least a first or second state. The mappings used by the multiplexer may be stored in the storage 390 and retrieved by the controller 380. The controller 380 may also be configured to set the system into a receiving or transmitting mode.

The controller 380, and/or other illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in any suitable computer readable medium such as a volatile or non volatile memory such as a DRAM memory, flash memory, ROM memory, EPROM memory, EEPROM memory, registers, hard disk, a removable disk, a CD-ROM, or any other form of suitable storage medium known in the art. An exemplary storage medium is coupled to the processor such that the processor can read information from, and write information to, the storage medium. In the alternative, the storage medium may be integral to the processor. The processor and the storage medium may reside in an ASIC or in any suitable commercially available chipset.

When the array is transmitting, or in a transmitting mode, a signal to be beamformed is produced by the controller 380. The controller 380 may retrieve data for producing the signal, or the signal itself, from the storage 390. The controller feeds the signal to be beamformed to the terminal connection 370, which is coupled to the splitter/summer 360, which in transmitting mode acts as a splitter, reproducing the signal at the terminal connection 370 to each of the phase-shifters 350. The phase-shifters are configured to phase-shift the signal received from the splitter/summer 360 to produce phase-shifted signals which are fed to a plurality of splitter/summers 340, which, again act as splitters, reproducing the phase-shifted signals at the connections 330, which act as inputs into the multiplexer in the transmitting mode. The connections 330 are coupled to the transducers 311 via a first mapping.

Figure 3B:
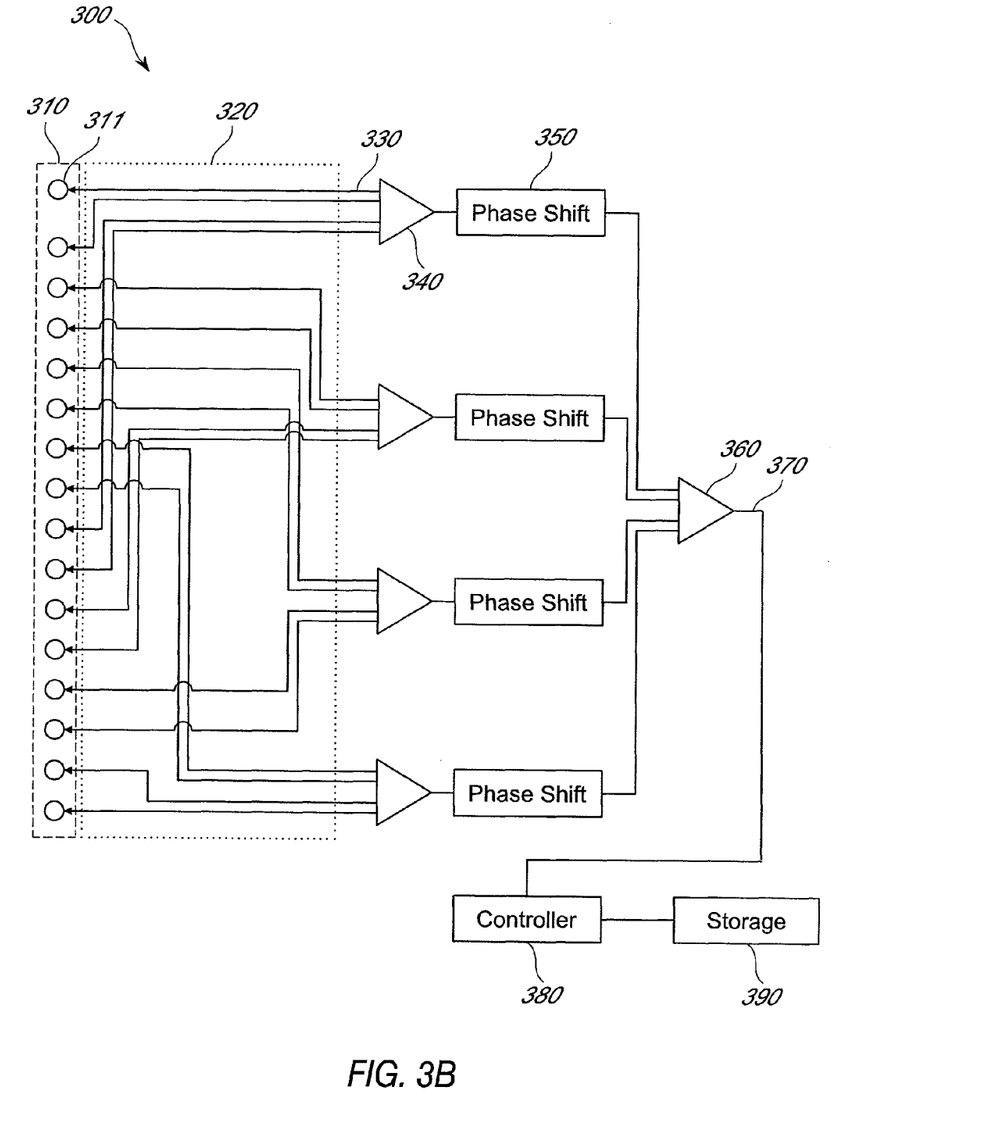
FIG. 3B is a functional block diagram of the beamforming system, wherein the multiplexer in a second state.

FIG. 3B is a functional block diagram of the beamforming system 300, wherein the multiplexer 320 in a second state. In the second state, the multiplexer couples the plurality of connections 330 to the transducers 311 via a second mapping.

Figure 4A:
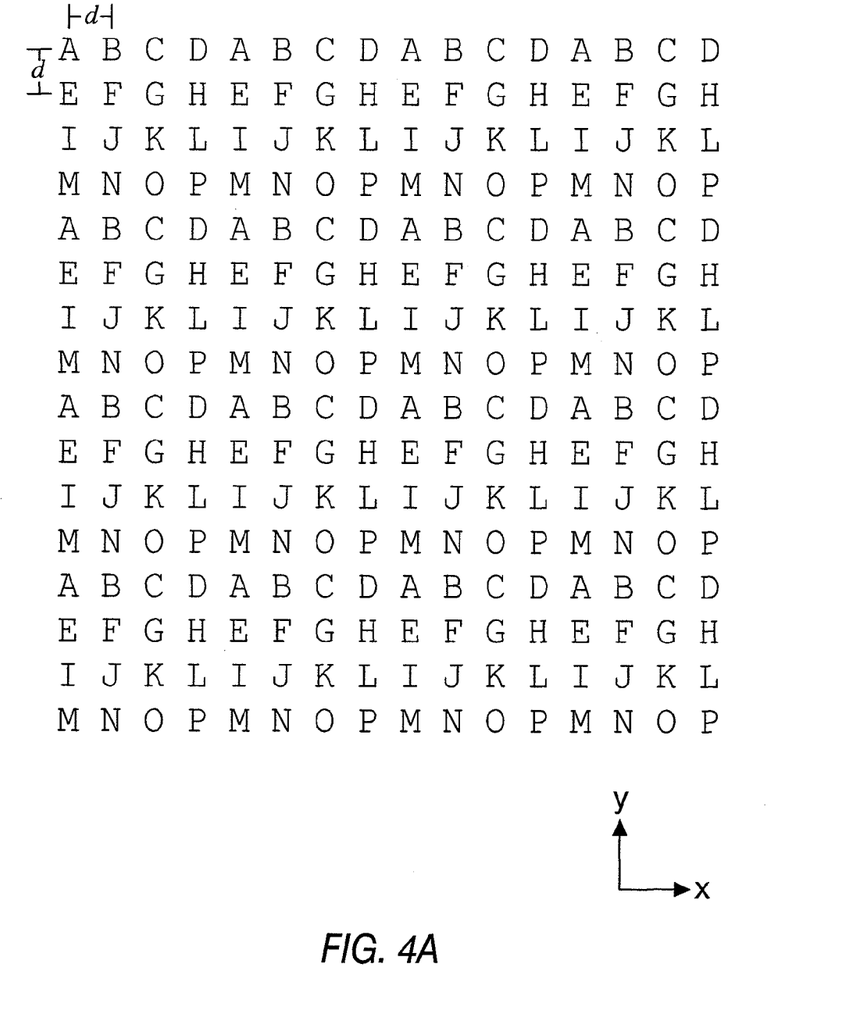
FIG. 4A is a diagram illustrating the signals transmitted from a regular planar phased array in a first state.

The same concept illustrated in FIGS. 2A and 2B can be applied to a two-dimensional planar array to generate four beams, such as those shown in FIG. 1. FIG. 4A is a diagram illustrating the signals transmitted from a regular planar phased array in a first state. The array 400 comprises a 16×16 grid of 256 transducers 401. In the illustrated embodiment, the transducer spacing in the x-direction and the transducer spacing in the y-direction is equivalent, denoted in figure as $d_1$. In other embodiments, the transducer spacing in the x-direction and y-direction may be different. As in one-dimension, described with respect to FIG. 2A, each transducer 401 is configured to transmit a phase-shifted version of the same signal. In a first state of the array, the relative phase between each adjacent transducer in the x-direction, is either +90 degrees or −90 degrees. This forms an array having an element spacing of $d_1$ in the x-direction. Similarly, the relative phase between adjacent transducers in the y-direction, is either +90 degrees or −90 degrees. This forms an array having an element spacing of $d_1$ in the y-direction. Depending on the selection of relative phase in the x-direction and y-direction, four different beams can be created including a first beam with a x-direction beam angle of +θ and a y-direction beam angle of +θ, a second beam with a x-direction beam angle of +θ and a y-direction beam angle of −θ, a third beam with a x-direction beam angle of −θ and a y-direction beam angle of +θ, and a fourth beam with a x-direction beam angle of −θ and a y-direction beam angle of −θ.

The signal transmitted from a first element of the array and the signal from another element of the array which is spaced four elements away in either the x-direction or the y-direction are phase-shifted by 360 degrees, and are thus identical signals. To form any of the four beams listed above, only four different signals are transmitted from elements of the array, corresponding to a signal phase-shifted by 0 degrees, 90 degrees, 180 degrees, and 270 degrees respectively.

To form the first beam of the exemplary beams, the elements A, F, K, and P transmit the same signal, the original signal phase-shifted by 0 degrees, B, G, L, and M transmit the same signal, the original signal phase-shifted by 90 degrees, C, H, I, and N transmit the same signal, the original signal phase-shifted by 180 degrees, and D, E, J, and O transmit the same signal, the original signal phase-shifted by 270 degrees.

To form the second beam of the exemplary beams, the elements denoted A, H, K, and N transmit the same signal, the original signal phase-shifted by 0 degrees, B, E, L, and O transmit the same signal, the original signal phase-shifted by 90 degrees, C, F, I, and P transmit the same signal, the original signal phase-shifted by 180 degrees, and D, G, J, and M transmit the same signal, the original signal phase-shifted by 270 degrees.

To form the third beam of the exemplary beams, the elements denoted A, H, K, and N transmit the same signal, the original signal phase-shifted by 0 degrees, B, E, L, and O transmit the same signal, the original signal phase-shifted by −90 degrees, C, F, I, and P transmit the same signal, the original signal phase-shifted by −180 degrees, and D, G, J, and M transmit the same signal, the original signal phase-shifted by −270 degrees.

To form the fourth beam of the exemplary beams, the elements A, F, K, and P transmit the same signal, the original signal phase-shifted by 0 degrees, B, G, L, and M transmit the same signal, the original signal phase-shifted by −90 degrees, C, H, I, and N transmit the same signal, the original signal phase-shifted by −180 degrees, and D, E, J, and O transmit the same signal, the original signal phase-shifted by −270 degrees.

Figure 4B:
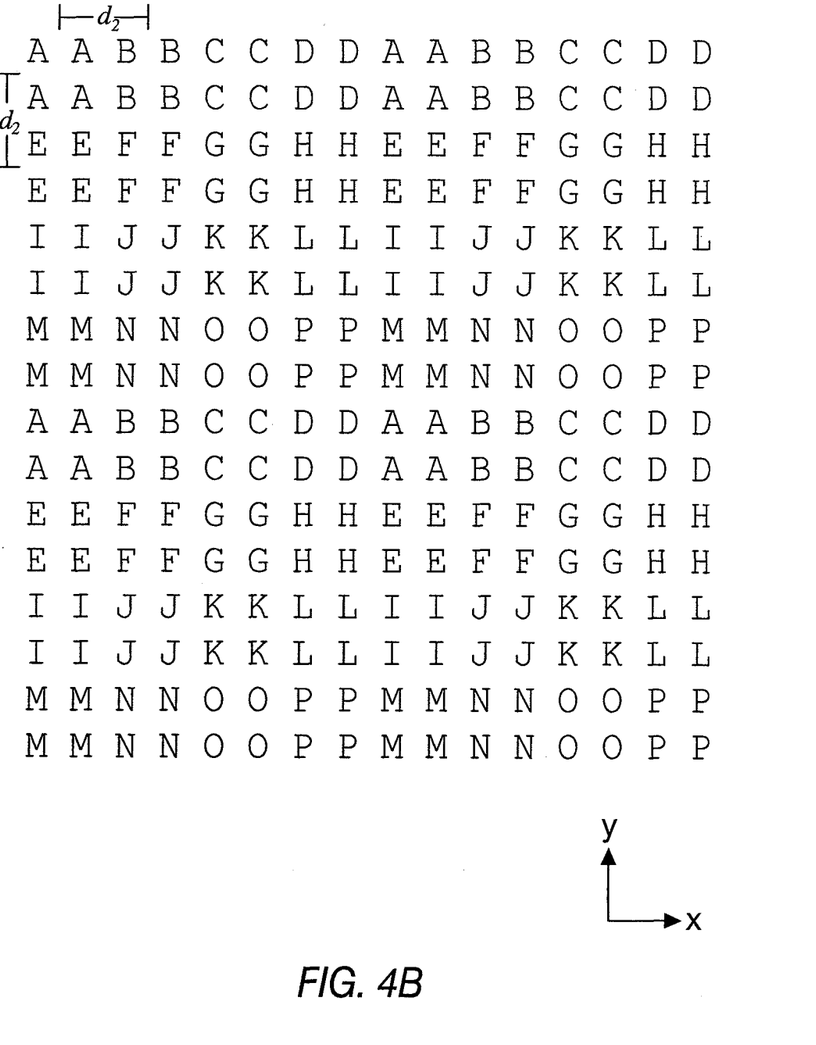
FIG. 4B is a diagram illustrating the signals transmitted from the regular planar phased array in a second state.

FIG. 4B is a diagram illustrating the signals transmitted from the regular planar phased array in a second state. In the second state of the array 400, the transducers 401 are functionally combined to form groups of adjacent transducers 402. Each group of adjacent transducers 402 is configured to transmit the same signal, thus each group 402 acts as a single element. The resulting array of groups is a regular planar array with an element spacing in the x-direction and an element spacing in the y-direction of $d_2$, which is two times $d_1$.

While the embodiments of FIGS. 4A and 4B illustrate groups formed by combination in both a vertical and horizontal direction, other embodiments may form groups in only the horizontal or vertical direction. By combining elements into groups in the x-direction, but not in the y-direction, element spacing may be $d_2$ in the x-direction, but remain $d_1$ in the y-direction. Similarly, in the illustrated embodiment, the group size in the x-direction and y-direction was two. The group size could be two in one direction and greater than two in the other direction.

The multiplexer may be configured to include a maximal state, where the group size equals the number of transducers. In such a state, each transducer would be configured to transmit the same signal, resulting in a single vertical beam.

Figure 5:
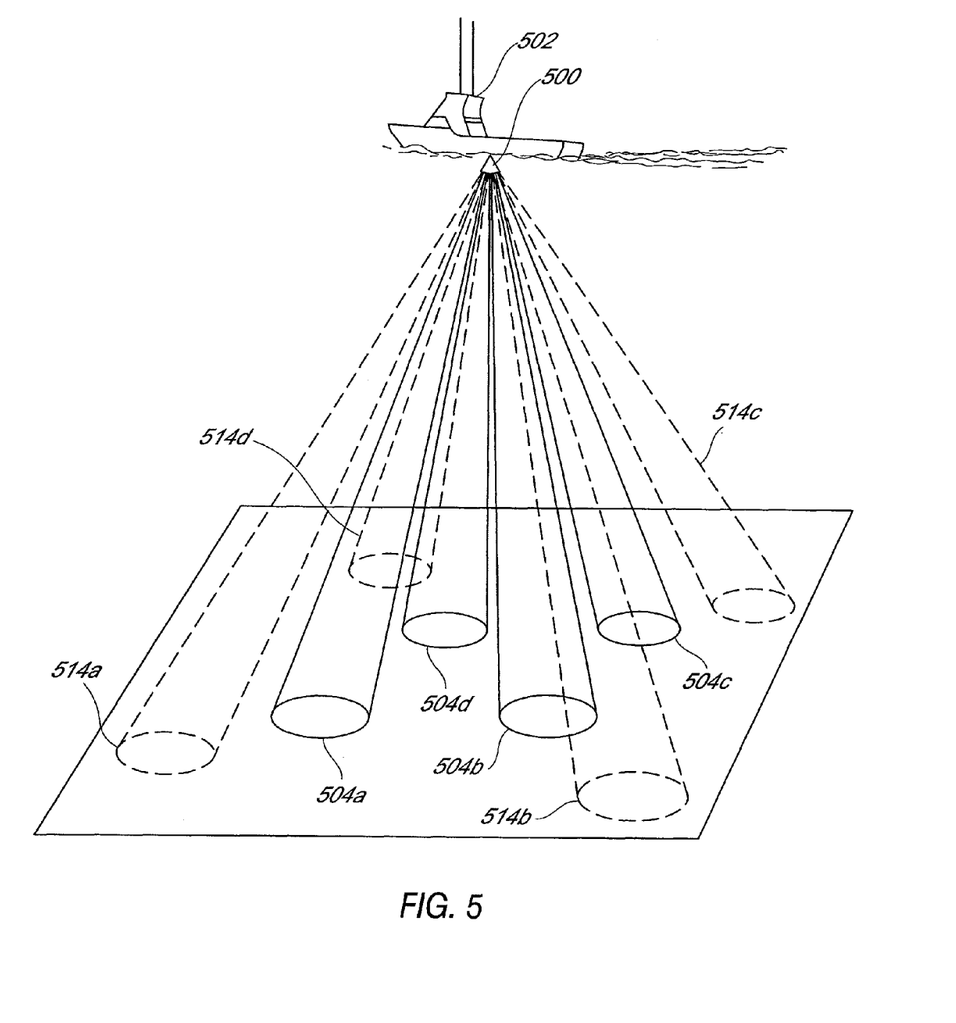
FIG. 5 is a perspective view of a dual Janus beam system attached to the hull of a vessel.

FIG. 5 is a perspective view of a dual Janus beam system 500 attached to the hull of a vessel 502. The dual Janus beam system 500 is capable of producing a first set of Janus beams 504 having a first beam angle as well as a second set of Janus beams 514 having a second beam angle. One potential application of a dual Janus beam system is for improving measurements of river discharge. River discharge estimates based on acoustic Doppler current profiler (ADCP) measurements may suffer from difficulties in measuring near the surface and near the bottom. A dual Janus beam system can address this problem by having a different beam angle for profiling near each boundary. For example, an array configured to generate a beam with a 22 degree beam angle would be able to profile closer to the bottom (further from the array) than a beam with a larger beam angle. The same array configured to generate a beam with a 48.5 degree beam angle would be able to profile closer to the surface (closer to the array). In some embodiments, the system would ping the two sets of Janus beams alternatively.

Another limitation of some river discharge measurement using ADCPs is inaccurate depth measurement. A larger beam, e.g. a beam with a 48.5 degree beam angle would have sufficient range, even at a 600 kHz operating frequency, to accurately measure the depth of almost all rivers of the world. Further, the four depth measurements (from the four Janus beams) could be compared to determine a bottom "quality index." For example, if the depths between the beams are too great, this could be an indication of a poor choice of site for the measurement. The "quality index" may indicate, for example, that the bottom is not sufficiently "flat" for meaningful bottom depth measurement to be made. The quality index could be derived from the measurements via a number of methods, including determining the maximum difference between the measurements, the average difference between the measurements, or a standard deviation of the measurements.

Another embodiment of a dual Janus beam system is configured to enhance ADCP velocity processing. The two beam angles of a dual Janus beam system may provide a way to determine absorption and terrain bias that are a source of long term error in some Doppler velocity logs (DVLs). These errors could be partially or completely compensated.

Phased array bandwidth limitations make it difficult to resolve ambiguity by certain velocity processing algorithms. A beam with a 22 degree beam angle has an increased velocity range compared to a beam with a 30 degree beam angle. This increased range could be used to resolve ambiguity for a beam with a larger beam angle, e.g. 48.5 degrees, that would have a lower standard deviation than a beam with a 30 degree beam angle for the same lag. The 22 degree beam velocity estimate could be used when the signal-to-noise ratio (SNR) of the 48.5 degree beam is too low.

Another embodiment of a dual Janus beam system is configured for use on a AUV (autonomous underwater vehicle), such as an underwater glider. The path of a glider AUV often comprises a steep ascent or descent, e.g. with an angle of approximately 26 degrees. This may present a challenge to DVLs with four fixed beams. For example, a DVL with a 30 degree beam angle with one of the beam axes parallel to the fore/aft axis of the Glider would only have a three beam measurement during the last ~38 percent of its range. A larger beam angle, e.g. 48.5 degrees, could be used for the most vertical beam so that it has similar resolution per profile bin as the cross-axis beams. Using a smaller beam angle, e.g. 22 degrees, for the remaining beams (cross axis and least vertical) could result in a three-beam solution on only the last ~24 percent of its range.

Yet another embodiment of a dual Janus beam system is configured for bathymetry and on an echo sounder instrument. Two sets of Janus beams provide a coverage advantage over a single set of Janus beams. Such a system may provide an accurate depth measurement at four locations at one time and a two-axis slope measurement.

In one embodiment of an echo sounder, the system is configured to produce a set of four Janus beams in a first state and a single vertical beam in a second state. The four beam measurement would be capable of measuring bottom slope in addition to the vertical depth to the bottom.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A dual beam system comprising:
a planar array of transducers; and
a multiplexer configurable into at least a first state and a second state, the multiplexer configured to electrically connect transducers of the planar array of transducers to a plurality of connections differently in the first state than in the second state, the plurality of connections configured to function as inputs to the multiplexer when the system is in a transmit mode;
wherein the system is configured to transmit a first beam from the planar array of transducers when the multiplexer is in the first state, the first beam having a first beam angle with respect to a central axis; and
wherein the system is configured to transmit a second beam from the planar array when the multiplexer is in a second state, the second beam having a second beam angle with respect to the central axis, the second beam angle being different than the first beam angle.

2. The system of claim 1, wherein the system is configured to alternatively energize the first beam and the second beam.

3. The system of claim 1, wherein the system is configured to compensate at least in part, based on the first beam and the second beam, for errors in Doppler velocity logs resulting from absorption and terrain bias.

4. The system of claim 1, wherein the first beam angle is suitable for surface tracking and the second beam angle is suitable for bottom tracking, the second beam angle being less acute than the first beam angle.

5. The system of claim 1, wherein the planar array of transducers is arranged in a two-dimensional grid.

6. The system of claim 1, wherein the multiplexer is configurable into a third state that is different from both the first state and the second state.

7. The system of claim 1, wherein adjacent transducers of the planar array of transducers are functionally combined into a group of two or more transducers that is configured to function as a single element in one of the first state and the second state.

8. The system of claim 1, wherein an effective element spacing in at least one direction of the planar array of transducers is different in the first state than in the second state.

9. The system of claim 1, wherein an effective element spacing in at least one direction of the planar array of transducers is double the spacing in the first state compared to the spacing in the second state.

10. The system of claim 1, wherein the planar array has a different effective element spacing in both a first direction and a second direction substantially orthogonal to the first direction in the first state than in the second state.

11. The system of claim 1, wherein the plurality of connections are electrically connected to a plurality of circuit elements configured to phase shift a signal when the system is in the transmit mode.

12. The system of claim 1, wherein the first beam in included in a first set of Janus beams, wherein the second beam is included in a second set of Janus beams, and wherein each set of Janus beams comprises three beams for measuring velocity and another beam for redundancy.

13. The system of claim 1, wherein the first beam in included in a first set of Janus beams, wherein the second beam is included in a second set of Janus beams, and wherein each set of Janus beams comprises three beams for measuring velocity.

14. The system of claim 13, wherein the system is configured to transmit each beam of the first set of Janus beams concurrently.

15. A sonar system comprising:
an array of transducers; and
means for multiplexing a plurality of connections with the array of transducers between at least a first state and a second state, wherein an effective element spacing in at least one direction of the array of transducers is different in the first state than in the second state.

16. The sonar system of claim 15, wherein the array of transducers has a different effective element spacing in two substantially orthogonal directions of the array of transducers in the first state than in the second state.

17. The system of claim 15, wherein the means for multiplexing are configured to multiplex the plurality of connections of the array of transducers among the first state, the second state, and a third state.

18. The system of claim 15, further comprising a summer/splitter electrically connected to at least one of the plurality of connections, the summer/splitter configured to sum signals from the array of transducers when the array of transducers is operating in a receiving mode, and the summer/splitter configured to reproduce a signal provided to the array of transducers when the array of transducers is operating in a transmitting mode.

19. The system of claim 15, where the sonar system is configured as an acoustic Doppler current profiler.

20. A method of operating a sonar system including a planar array of transducers and a multiplexer, the method comprising:
transmitting first data to or receiving first data from the planar array of transducers, the first data corresponding to a first set of Janus beams having a first beam angle;
changing a state of the multiplexer; and
after changing the state of the multiplexer, transmitting second data to or receiving second data from the same planar array of transducers, the second data corresponding to a second set of Janus beams having a second beam angle, the second beam angle being different than the first beam angle.

21. The method of claim 20, wherein the first data is indicative of acoustic signals for use in at least one of a bottom detection system, a velocity measurement system, an echo sounder, and a bathymetric system.

22. The method of claim 20, wherein changing the state of the multiplexer causes adjacent transducers of the planar array of transducers to be functionally combined into a group of two or more transducers configured to function as a single element.

23. The method of claim 20, further comprising phase shifting an input signal and generating a plurality of phase-shifted signals that are provided to the array of transducers.

24. A dual Janus beam system comprising:
a planar array of transducers; and
a beamformer configurable into at least a first state and a second state;
wherein the beamformer is configured to generate a first set of Janus beams from the planar array of transducers in the first state, the first set of Janus beams having a first beam angle with respect to a central axis; and
wherein the beamformer is configured to generate a second set of Janus beams from the planar array of transducers in the second state, the second set of Janus beams having a second beam angle with respect to the central axis, the second beam angle being different than the first beam angle.

* * * * *